US012752626B2

(12) United States Patent
Kajita

(10) Patent No.: US 12,752,626 B2
(45) Date of Patent: Oct. 6, 2026

(54) VEHICLE INSTRUMENT PANEL AND METHOD OF MANUFACTURING THE SAME

(71) Applicant: TOYOTA JIDOSHA KABUSHIKI KAISHA, Toyota (JP)

(72) Inventor: Keisuke Kajita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 390 days.

(21) Appl. No.: 18/536,227

(22) Filed: Dec. 12, 2023

(65) Prior Publication Data

US 2024/0262202 A1 Aug. 8, 2024

(30) Foreign Application Priority Data

Feb. 8, 2023 (JP) ................................. 2023-017937

(51) Int. Cl.
*B60K 35/60* (2024.01)
*B60K 37/00* (2024.01)
*B60K 37/20* (2024.01)

(52) U.S. Cl.
CPC .............. *B60K 35/60* (2024.01); *B60K 37/00* (2013.01); *B60K 37/20* (2024.01)

(58) Field of Classification Search
None
See application file for complete search history.

(56) References Cited

U.S. PATENT DOCUMENTS 6,328,924 B1 * 12/2001 Matsumoto ........... B29C 43/183 264/294
6,612,607 B1 * 9/2003 Takahashi ........... B60R 21/2171 280/732
6,733,713 B2 * 5/2004 Takahashi ........... B29C 45/0081 264/328.12
7,063,349 B2 * 6/2006 Takahashi ............... B29C 45/56 280/732
9,096,130 B2 * 8/2015 Pechnyk ............... B60R 21/215
9,193,394 B1 * 11/2015 Bharathan ........... B29C 45/0005
10,239,428 B2 * 3/2019 Yamauchi ............ B60N 2/2887
11,052,762 B2 * 7/2021 Nakamura ........... B60K 35/265
11,648,820 B2 * 5/2023 Doi ...................... B62D 25/142 454/124
11,661,112 B2 * 5/2023 Chiba .................. B62D 25/145 296/70
2008/0030048 A1 * 2/2008 Tsuda ...................... B60R 13/02 296/146.7

FOREIGN PATENT DOCUMENTS

JP H09-052567 A 2/1997
JP 2002-052548 A 2/2002
JP 2012-228788 A 11/2012

* cited by examiner

*Primary Examiner* — Aaron L Lembo
(74) *Attorney, Agent, or Firm* — SOLARIS Intellectual Property Group, PLLC

(57) ABSTRACT

A vehicle instrument panel, includes: a base material extending in a vehicle width direction, at a front part of a vehicle cabin interior of a vehicle; a skin provided with a pair of skin materials, each of the skin materials having an end part thereof joined together at a skin joining part, and the skin forming a design face at the vehicle cabin interior, and a cushion part provided between the base material and the skin and formed of a foamed resin. The base material is provided with a rib at a position facing the skin joining part of the skin.

5 Claims, 5 Drawing Sheets

VEHICLE INSTRUMENT PANEL AND METHOD OF MANUFACTURING THE SAME

CROSS-REFERENCE TO RELATED APPLICATION

This application claims priority under 35 USC 119 from Japanese Patent Application No. 2023-17937, filed on Feb. 8, 2023, the disclosure of which is incorporated by reference herein in its entirety.

BACKGROUND

Technical Field

The present disclosure relates to a vehicle instrument panel and a method of manufacturing the same.

Related Art

Japanese Patent Application Laid-open (JP-A) No. 2012-228788 discloses an instrument panel and a manufacturing method thereof, in which a cushion material (cushion part) made of a foam resin is filled between a skin material (skin) and a base material. The skin material of the instrument panel is a soft skin material in which a synthetic resin layer is provided on a surface of a thermoplastic non-woven fabric.

The instrument panel of the above-noted patent document is molded by setting a base material and a skin material in a mold and closing the mold, injecting urethane (a foaming crude liquid) between the base material and the skin material, and foaming and solidifying the urethane.

SUMMARY

Incidentally, from the standpoint of design, an instrument panel for a vehicle may be configured including plural skin materials, with the skin being divided between an upper part and a lower part. In this case, the skin joining part, at which the ends of the plural skin materials are joined together, is not directly supported by the mold during molding of the cushion part. For this reason, if a foaming crude liquid such as urethane is injected between the skin and the base material, there is a possibility that the skin joining part may collapse owing to the foaming crude liquid that is flowing in. Moreover, the collapsed skin joining part may narrow the flow path of the foaming crude liquid, thereby hindering the flow of the foaming crude liquid. Since this prevents uniform filling of the foaming crude liquid between the base material and the skin, it is not possible to form the intended design.

In particular, in cases in which the skin material is soft, such as in the instrument panel described in the above-noted patent document, providing a skin joining part tends to cause the skin joining part to collapse, as compared to a case in which a hard skin material such as TPU (thermoplastic polyurethane) is used. Accordingly, there is room for improvement in maintaining the design properties while including plural skin materials.

In consideration of the foregoing circumstances, the present disclosure obtains a vehicle instrument panel and a method of manufacturing the same, in which the vehicle instrument panel includes plural skin materials while maintaining the design properties.

A vehicle instrument panel of a first aspect of the present disclosure includes: a base material extending in a vehicle width direction, at a front part of a vehicle cabin interior of a vehicle; a skin provided with a pair of skin materials, each of the skin materials having an end part thereof joined together at a skin joining part and the skin forming a design face at the vehicle cabin interior; and a cushion part provided between the base material and the skin and formed of a foamed resin, wherein the base material is provided with a rib at a position facing the skin joining part of the skin.

According to the vehicle instrument panel of the first aspect, the rib at the base material is provided so as to face the skin joining part of the skin.

When the base material does not have the rib, when a mixed and stirred crude liquid of a foamed resin (hereafter, referred to as a "foaming crude liquid") flows into a space between the base material and the skin during molding of the cushion part, a skin joining part that is not directly supported by a mold may collapse as a result of the flow of the foaming crude liquid. Further, there is a risk that the collapsed skin joining part will narrow the flow path of the foaming crude liquid.

In contrast, according to the present disclosure, when the foaming crude liquid flows between the base material and the skin, the rib provided at the base material so as to face the skin joining part supports the skin joining part, thereby inhibiting collapse of the skin joining part. Namely, the rib secures the flow path for the foaming crude liquid. This enables the foaming crude liquid to be extensively filled between the base material and the skin without being hindered by the skin joining part. Therefore, the intended design can be formed.

A vehicle instrument panel of a second aspect is the configuration according to the first aspect, in which the base material includes a base material upper part disposed at a vehicle rear side of a lower end part of a windshield separating a vehicle cabin interior part from a vehicle cabin exterior part, a base material lower part disposed at a vehicle rear side and a vehicle lower side of the base material upper part, and a concave part that links a vehicle rear side end of the base material upper part with a vehicle front side end of the base material lower part, extends in the vehicle width direction, and is recessed toward a vehicle front side as seen in a side view. The pair of skin materials of the skin are configured as an upper skin material that covers the base material upper part and a lower skin material that covers the base material lower part. The skin joining part, at which a surface of one end part at a vehicle rear side of the upper skin material is joined to a surface of one end part at a vehicle front side of the lower skin material, is inserted into the concave part of the base material. A foaming crude liquid of the foamed resin configuring the cushion part is injected from the base material upper part of the base material toward the concave part, and the rib is disposed at the concave part at a lower side of the skin joining part.

According to the vehicle instrument panel of the second aspect, since the skin joining part, which is the joint section between the upper skin material and the lower skin material, is inserted and disposed in the concave part, as viewed from inside the vehicle cabin, the seam between the upper skin material and the lower skin material is situated at a rearward position, and is not noticeable. This enables the appearance of the skin to be improved and the design properties to be improved in comparison to cases in which the seam between the upper skin material and the lower skin material is exposed. Moreover, since different materials or different colors can be selected for both the upper skin material and the lower skin material, the degree of freedom for the design of the instrument panel, and thus the vehicle cabin space, are improved.

The foaming crude liquid is injected from the base material upper part towards the concave part. Accordingly, during molding of the cushion part, the foaming crude liquid flows into the concave part of the base material from above. At such time, if no ribs were provided at the base material, the skin joining part of the skin would fall downward as a result of the foaming crude liquid that has flowed in. This would cause the flow path between the base material and the skin to be narrowed or blocked, preventing the foaming crude liquid from flowing between the base material lower part and the lower skin material. Although it would be conceivable to secure the flow path by enlarging the concave part, this would reduce the space inside the instrument panel in the vehicle, thereby diminishing the space efficiency.

In contrast, according to the present disclosure, the rib is provided at a lower side of the skin joining part of the skin at the concave part of the base material. The skin joining part, which is pushed by the foaming crude liquid and susceptible to collapse, is supported from below by the rib. Namely, the foaming crude liquid flow path is secured by the rib, and the foaming crude liquid flows between the lower part of the base material and the lower skin material, and therefore, the foam resin fills into every corner.

A vehicle instrument panel of a third aspect of the present disclosure is the configuration according to the second aspect, in which the rib of the base material includes plural ribs, which are disposed in parallel with each other at an interval in the vehicle width direction.

According to the vehicle instrument panel of the third aspect, the plural ribs are arranged at intervals along the skin joining part extending in the vehicle width direction. This enables a wide flow path for the foaming crude liquid during molding of the cushion part to be secured. This enables the foaming crude liquid to be injected more efficiently and uniformly between the base material and the skin. Further, since the plural ribs are arranged in parallel to each other, even in cases in which they are integrally molded as a part of the base material, they can be easily removed from the mold. Namely, the plural ribs can be easily integrally molded as a part of the base material.

A vehicle instrument panel of a fourth aspect of the present disclosure is the configuration according to the first aspect, in which at least one skin material of the pair of skin materials is configured by polyvinyl chloride.

According to the vehicle instrument panel of the fourth aspect, at least one skin material of the pair of skin materials is made of soft PVC (polyvinyl chloride). In general, in cases in which a skin joining part is configured including a soft PVC skin material, compared to cases in which a hard material such as TPU is used for both of a pair of skin materials, during molding of the cushion part, the skin joining part tends to collapse as a result of being pushed by the foaming crude liquid. However, according to the present disclosure, the soft skin joining part is supported by the rib of the base material. This enables the foam resin to be filled into every corner and to realize the intended design. Since PVC is cheaper than TPU and emits less carbon dioxide during manufacture, the cost and environmental impact can be reduced.

A method of manufacturing a vehicle instrument panel of a fifth aspect of the present disclosure includes: molding a skin having a pair of skin materials each having an end part thereof joined together at a skin joining part; molding a base material provided with a plurality of ribs at positions corresponding to the skin joining part; setting the base material in one die and setting the skin in another die, and closing the one die and the other die; and molding a cushion part by injecting a foaming crude liquid between the base material and the skin.

According to the method of manufacturing a vehicle instrument panel of the fifth aspect, in a skin molding process, a skin including a pair of skin materials is formed. Ends of the pair of skin materials are joined together at the skin joining part. In a base material molding process, the base material is molded. At this time, plural ribs are formed at the base material at positions corresponding to the skin joining part of the skin.

Next, in a setting process, the base material is set in one mold, the skin is set in another mold, and the one mold and the other mold are closed. As a result, the skin joining part of the skin and the plural ribs of the base material oppose each other.

Then, in a cushion molding process, the foaming crude liquid is injected between the base material and the skin. When the foaming crude liquid flows between the base material and the skin in a case in which the base material does not have ribs, a skin joining part that is not directly supported by the other mold may collapse owing to the flow of the foaming crude liquid. Further, there is a risk that the collapsed skin joining part will narrow the flow path of the foaming crude liquid.

According to the manufacturing method of the fifth aspect, when the foaming crude liquid flows into the space between the base material and the skin during the cushion molding process, the plural ribs suppress collapse of the skin joining part. Namely, since the flow path for the foaming crude liquid is secured by the plural ribs, the foaming crude liquid flows extensively between the base material and the skin through the spaces between the plural ribs without being obstructed by the skin joining part. This enables the intended design to be produced.

As described above, the vehicle instrument panel of the first aspect has an advantageous effect of enabling the design properties to be maintained while including plural skin materials.

The vehicle instrument panel of the second aspect has an advantageous effect of enabling design properties to be improved while maintaining space-efficiency.

The vehicle instrument panel of the third aspect has an advantageous effect of enabling the number of manufacturing processes to be reduced while improving design properties.

The vehicle instrument panel of the fourth aspect has an advantageous effect of enabling cost and environmental load to be reduced.

The method of manufacturing a vehicle instrument panel of the fifth aspect has an advantageous effect of enabling the design properties to be maintained while including plural skin materials.

DETAILED DESCRIPTION

Figure 1:
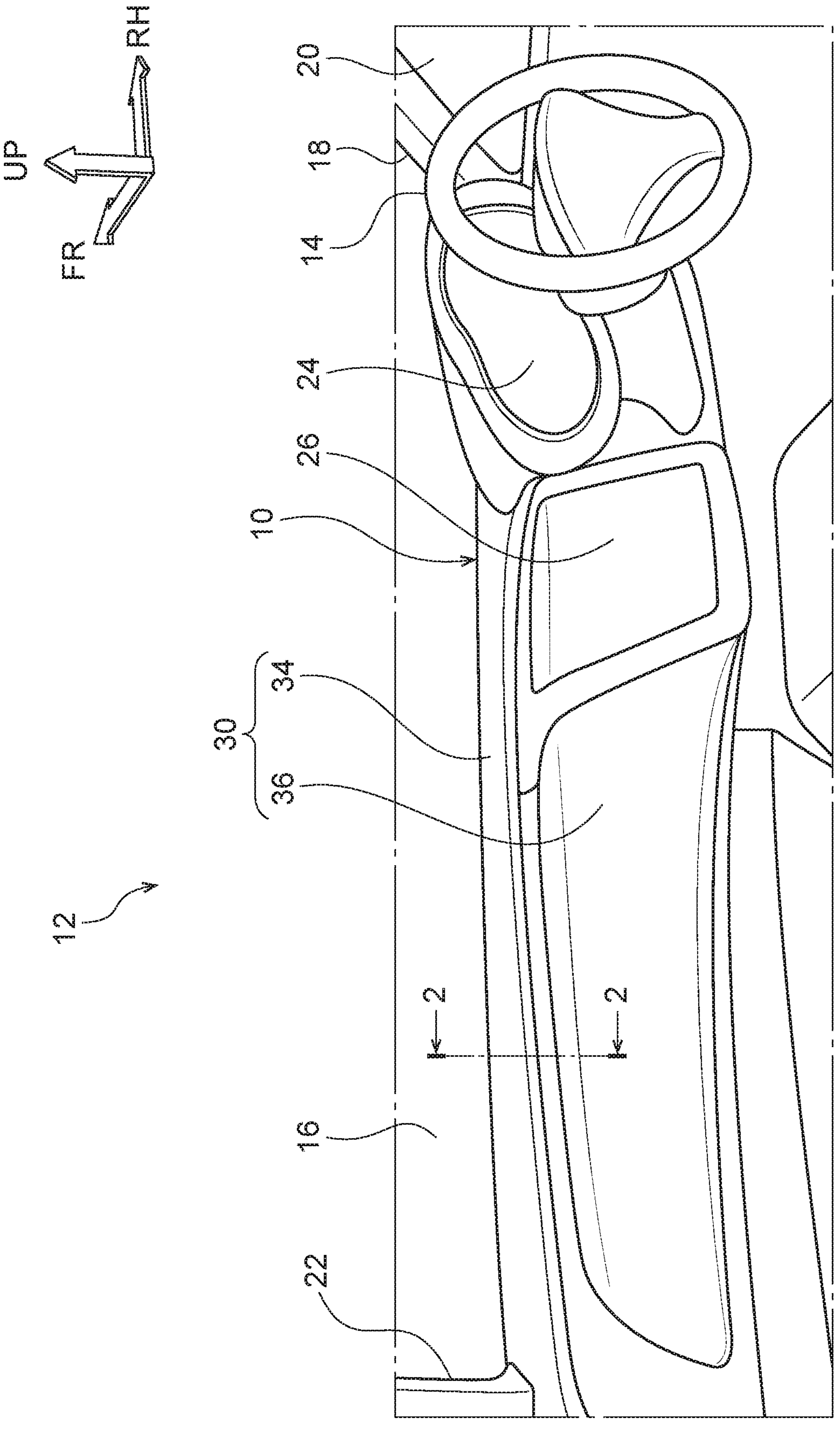
FIG. 1 is a schematic diagram illustrating a front part of a vehicle cabin, as viewed from a vehicle left rear side, of a vehicle provided with a vehicle instrument panel according to the present embodiment.

Explanation follows regarding a vehicle instrument panel 10 according to an exemplary embodiment of the present invention, with reference to FIG. 1 to FIG. 4. Note that the arrow FR, the arrow UP, the arrow LH, and the arrow RH illustrated in the drawings as appropriate respectively indicate a front side, an upper side, a left side in a left-right direction (width direction), and a right side in a left-right direction (width direction) of a vehicle 12 provided with a vehicle instrument panel 10. In cases in which the forward-rearward, upward-downward, left, and right directions are used in the following explanation, unless otherwise specified, these respectively indicate front and rear in a vehicle front-rear direction, up and down in a vehicle vertical direction, and left and right in a vehicle left-right direction (width direction). Following an explanation of the arrangement of the vehicle instrument panel 10 in the vehicle 12, explanation is provided regarding the configuration of the vehicle instrument panel 10 and a method of manufacturing the same.

[Arrangement of the Vehicle Instrument Panel 10]

As illustrated in FIG. 1, the vehicle instrument panel 10 extends in a substantially the width direction, at a front part inside a vehicle cabin of a vehicle 12. A steering wheel 14 is provided rearward of the instrument panel 10. The steering wheel 14 is provided, for example, on the right side of the vehicle. Namely, the vehicle 12 is a right hand drive vehicle. Note that the vehicle is not limited to a right hand drive vehicle, and may be a left hand drive vehicle in which the driver's seat is configured at the left side.

The instrument panel 10 is disposed at a vehicle lower side of the windshield glass 16. The windshield glass 16 is inclined downward on progression toward the front side so as to partition the inside of the vehicle cabin from the outside of the vehicle cabin.

The right side end part of the windshield glass 16 is fixed to an inner side in the vehicle width direction of a front pillar 18 at the right side, which extends substantially in the vertical direction. A front side glass 20 provided at a right side of the vehicle 12 is provided rearward of the front pillar 18. Similarly, a left side end part of the windshield glass 16 is fixed to a front pillar 22 at the left side. A meter display 24 is provided in front of the driving seat and at an upper part of the instrument panel 10. A center display 26 is provided at a central part of the instrument panel 10 in the vehicle width direction.

Figure 2:
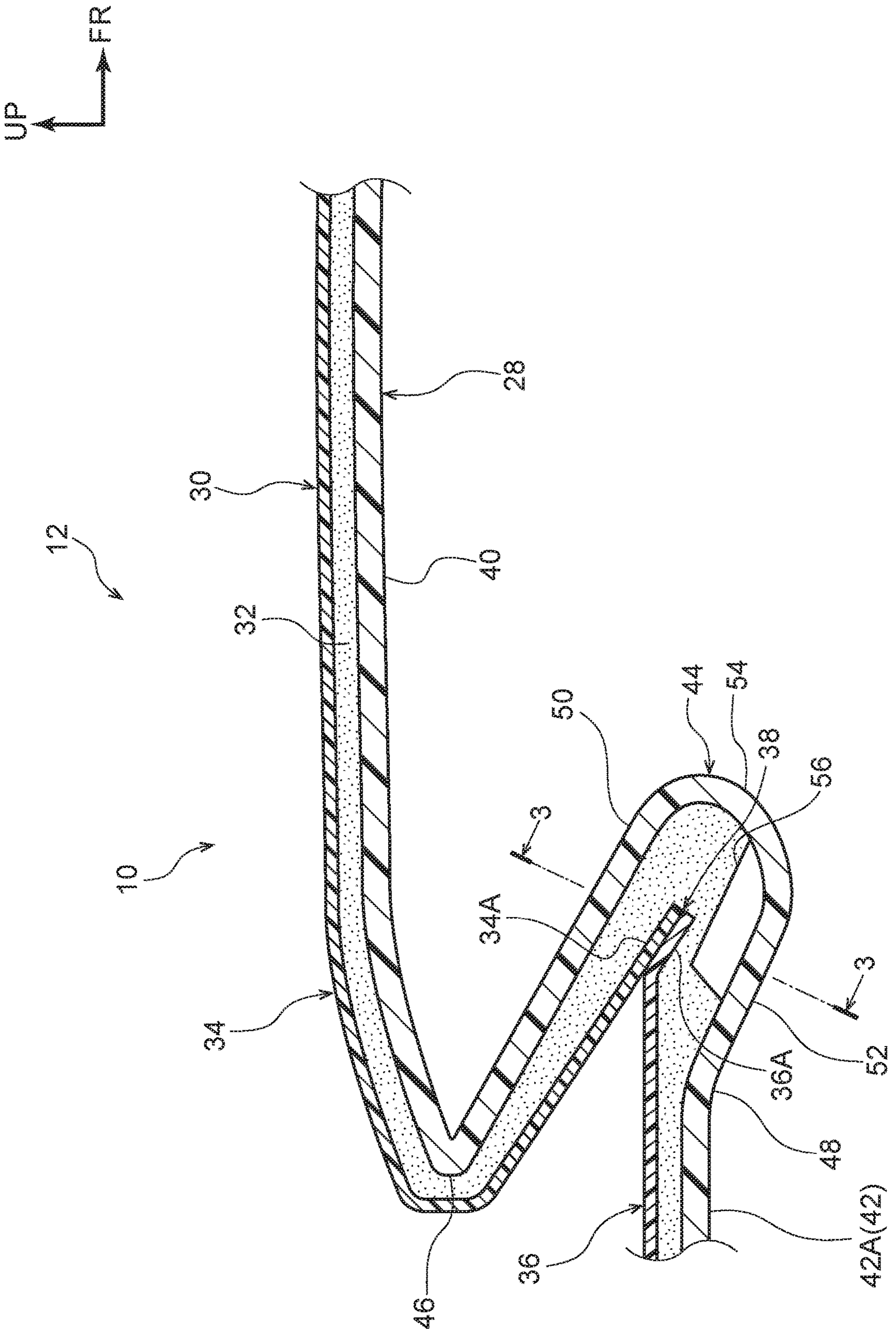
FIG. 2 is a cross-sectional view taken along line 2-2 of FIG. 1.

FIG. 2 shows a side sectional view of a cross section taken along the line 2-2 in FIG. 1, viewed from the right side. As illustrated in FIG. 2, the instrument panel 10 is formed of a hard resin such as PP (polypropylene) and is configured including a base material 28 configuring a framework, a skin 30 configuring the design surface inside the vehicle cabin, and a cushion part 32 made of a foamed resin such as polyurethane foam and provided between the base material 28 and the skin 30.

As illustrated in FIG. 1, the skin 30 includes an upper skin material 34 and a lower skin material 36 as a pair of skin materials. The upper skin material 34 and the lower skin material 36 are each configured by a soft skin material. In the present exemplary embodiment, as an example, the upper skin material 34 is a dark-colored, for example, black PVC skin material. The lower skin material 36 is a PVC skin material with a lighter color than the upper skin material 34, such as brown. In other words, the skin 30 is two-tone, separated between upper and lower parts. The skin is not limited to two-tone separated between upper and lower parts as described above, and for example, the upper skin material and the lower skin material may have the same color as each other. Alternatively, the color may be changed at a position other than the boundary between the upper skin material and the lower skin material. Alternatively, three or more colors may be used for the skin. Alternatively, a skin material of a different material may be used for the upper skin material and for the lower skin material.

As illustrated in FIG. 2, the rearward end part 34A of the upper skin material 34 and the forward end part 36A of the lower skin material 36 have their respective surfaces bonded together at a skin joining part 38. Note that in the present specification, in the upper skin material 34 and the lower skin material 36, the surface configuring the design surface inside the vehicle cabin is referred to as the front surface, and the surface on the opposite side, facing the base material 28, is referred to as the back surface. Although not illustrated in the drawings, the surface of the rearward end part 34A of the upper skin material 34 and the surface of the forward end part 36A of the lower skin material 36 are provided with concavo-convex shapes that fit together. This enables the bonding between the upper skin material 34 and the lower skin material 36 to be strengthened.

Note that the base material 28 includes a base material upper part 40 provided at an upper part, a base material lower part 42 provided at a lower part, and a concave part 44 connected to a rear end part of the base material upper part 40 and to a front end part of the base material lower part 42, extending in a vehicle width direction, and formed so as to be recessed forward of the vehicle and downward of the vehicle in a side sectional view.

The base material upper part 40 is disposed at a vehicle rear side of a lower end part of the windshield glass 16 (see FIG. 1), and extends in a substantially horizontal direction. A rear end part of the base material upper part 40 is formed slightly inclined toward a lower side of the vehicle.

The base material lower part 42 is disposed at a vehicle rear side and a vehicle lower side of the base material upper part 40, and includes a horizontal part 42A extending in a substantially horizontal direction, and a wall part (not illustrated) extending downward from a rear end part of the horizontal part 42A and facing a passenger seat.

The concave part 44 is formed in a substantially U-shape that is open rearward and obliquely upward of the vehicle in a side sectional view. In other words, the concave part 44 includes an upper wall 50 formed in a planar shape and inclining downward on progression toward the front side of the vehicle, a lower wall 52 provided substantially parallel to the upper wall 50 at a lower side of the upper wall 50, and a curved part 54 that connects a front end of the upper wall 50 and a front end of the lower wall 52 in a substantially vertical direction, and is formed curved so as to be convex toward a front side and obliquely downward.

An acute angle part 46 is formed between a rear end of the base material upper part 40 and a rear end of the upper wall 50 of the concave part 44, the acute angle part 46 being convex toward the rearward side. The acute angle part 46 is formed in a substantially V-shape in a side sectional view, and the rear end of the base material upper part 40 and the upper wall 50 of the concave part 44 intersect at an acute angle.

Further, between the front end of the horizontal part 42A of the base material lower part 42 and the rear end of the lower wall 52 of the concave part 44, an obtuse angle part 48 is formed that is convex toward an upper side and the front side. At the obtuse angle part 48, the forward end of the horizontal part 42A at the base material lower part 42 and the rearward end of the lower wall 52 of the concave part 44 intersect at an obtuse angle. The obtuse angle part 48 is provided closer to the front side of the vehicle than the acute angle part 46.

The upper skin material 34 described above is disposed, via the cushion part 32, at the front surface side of the base material 28, from an upper side of the base material upper part 40, across the rear side of the acute angle part 46, to a lower side of the upper wall 50 of the concave part 44. Note that in the present specification, the surface of the base material 28 at the inner side of the vehicle cabin is referred to as the front surface, and the surface on the opposite side thereof is referred to as the back surface.

The lower skin material 36 is disposed, via the cushion part 32, at the front surface side of the base material 28, from a front side of a wall part (not illustrated) of the base material lower part 42, across the upper side of the horizontal part 42A and the upper side of the obtuse angle part 48, to the upper side of the lower wall part 52 of the concave part 44.

Namely, the skin joining part 38, at which the surface of the one end part 34A of the upper skin material 34 and the surface of the one end part 36A of the lower skin material 36 are joined together, is inserted into the concave part 44 of the base material 28.

Note that in the concave part 44, a thin rib 56 is integrally provided at a surface of a portion of the lower wall 52 and the curved part 54. The rib 56 is provided plurally at positions opposing the skin joining part 38 of the skin 30; namely, on a lower side and slightly rearward side of the skin joining part 38. The respective ribs 56 are formed in a generally parallelogram shape having an upper side that is substantially parallel to the lower wall 52 in a side view, with a plate thickness direction of the ribs being along a substantially vehicle width direction.

Figure 3:
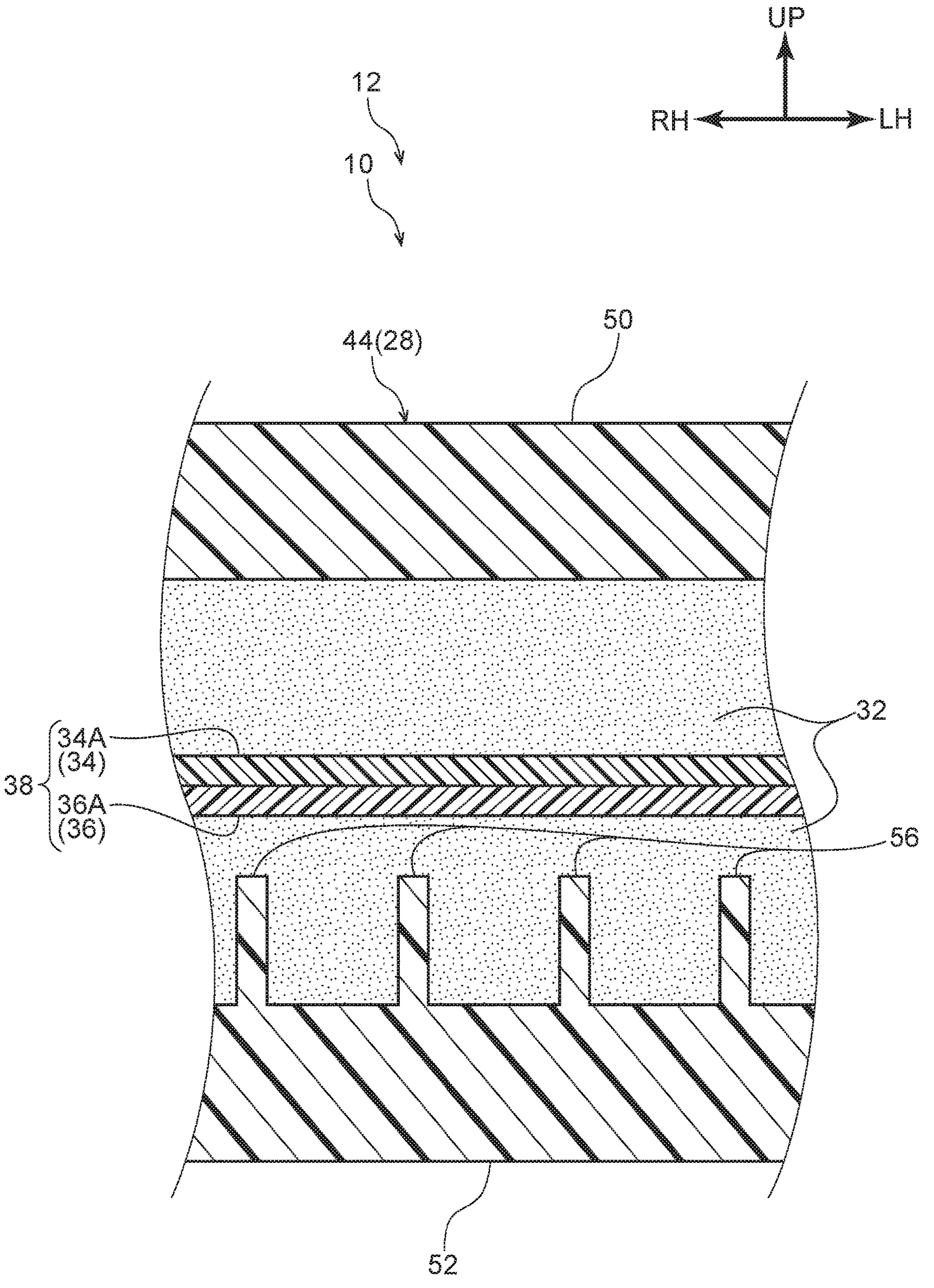
FIG. 3 is a cross-sectional view taken along line 3-3 of FIG. 2.

As illustrated in FIG. 3, the plural ribs 56 are arranged side by side along the substantial vehicle width direction, in correspondence with the skin joining part 38. More specifically, the plural ribs 56 are arranged parallel to each other with a gap therebetween in a substantially vehicle width direction.

Although not illustrated in the drawings, an injection port for injecting a foaming crude liquid of polyurethane foam configuring the cushion part 32 is formed in the base material upper part 40 (see FIG. 2) so as to penetrate substantially vertically. As an example, the injection port is formed at a central part in the vehicle width direction and at a central part in the forward-rearward direction of the base material upper part 40.

Operation of the Exemplary Embodiment

Next, explanation follows regarding a method of manufacturing the instrument panel 10, and explanation is thereby provided regarding the operation of the present exemplary embodiment.

First, in a skin molding process, the surface of the one end part 34A of the upper skin material 34 and the surface of the one end part 36A of the lower skin material 36 illustrated in FIG. 2 are bonded together so as to integrate the skin 30. Moreover, using a skin molding die (not illustrated), the skin 30 is shaped into a predetermined shape by thermoforming utilizing thermoplasticity such as hot press molding, vacuum molding, or vacuum pneumatic molding.

In a base material molding process, a base material molding die (not illustrated) is used to mold the base material 28 by a method such as injection molding. At this time, the plural ribs 56 are integrally formed on the base material 28. Since the plural ribs 56 are arranged parallel to each other, they can easily be removed from the substrate mold.

Next, in a setting process, the base material 28 is set in one die (not illustrated) of a mold, and the skin 30 is set in the other die (not illustrated) of the mold, and the one die and the other die are closed. At this time, the back surface of the base material 28 is in contact with the one die. Moreover, the front surface of the skin 30 is in contact with the other die. Moreover, a gap is formed between the front surface of the base material 28 and the back surface of the skin 30. Moreover, in this state, the skin joining part 38 of the skin 30 faces the plural ribs 56 of the base material 28.

Moreover, in a cushion molding process, a mixed and stirred foaming crude liquid is poured into the space between the set base material 28 and skin 30 from an injection port (not illustrated) formed at the base material upper part 40. The poured foaming crude liquid is foamed and solidified, thereby forming the cushion part 32 made of polyurethane foam.

Finally, in a mold releasing process, the mold is opened, and the instrument panel 10, including the base material 28, the cushion part 32, and the skin 30 integrated with each other, is taken out.

According to the above method of manufacturing the instrument panel 10, in the cushion molding process, the foaming crude liquid poured between the base material 28 and the skin 30 flows into the concave part 44 of the base material 28 from above. More specifically, the foaming crude liquid, with respect to the base material upper part 40, the acute angle part 46, the upper wall 50 of the concave part 44, the curved part 54 of the concave part 44, the lower wall 52 of the concave part 44, and the base material lower part 42, flows in uniformly in this order.

Figure 5:
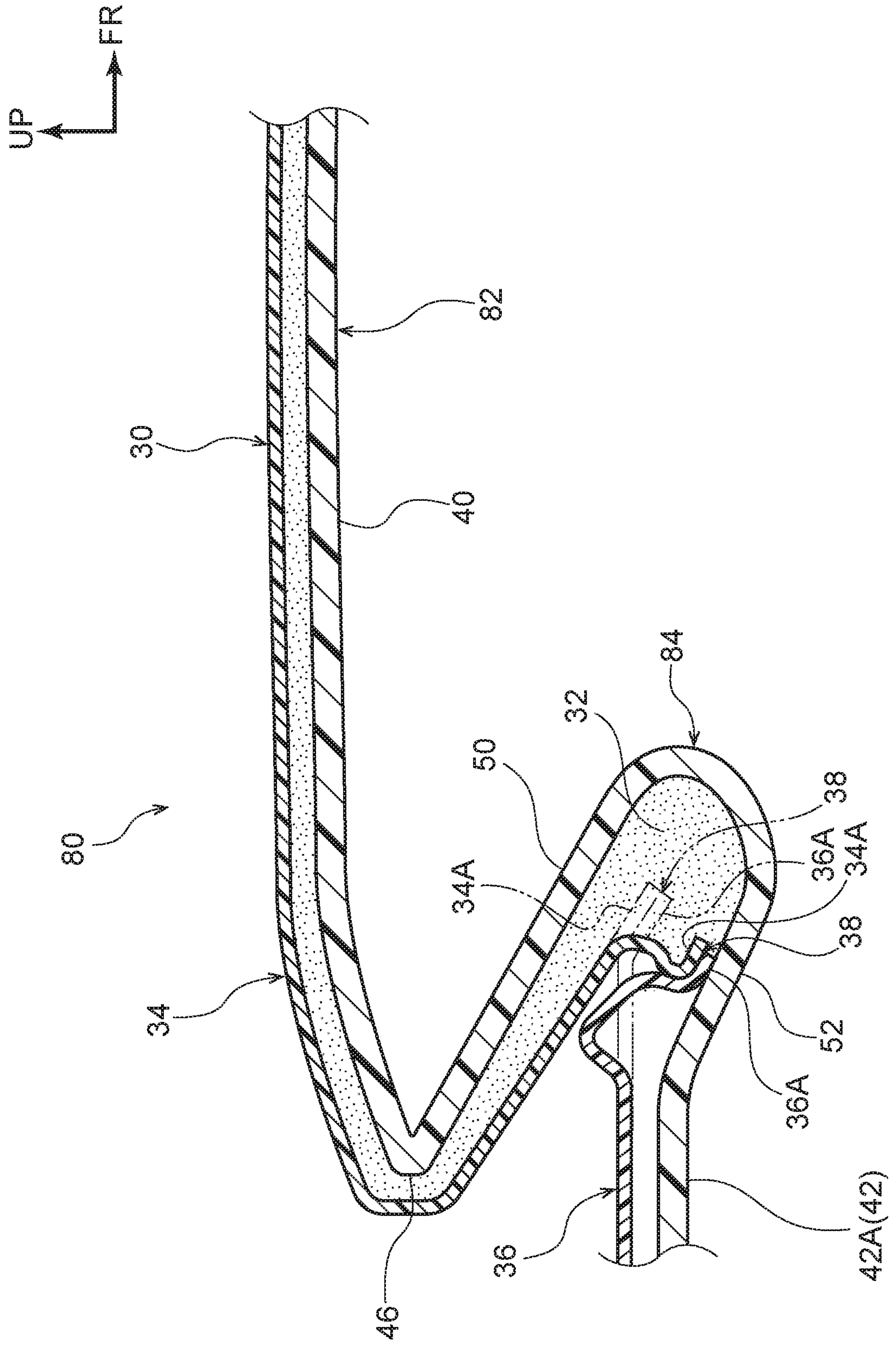
FIG. 5 is a side cross-sectional view of a vehicle instrument panel according to a comparative example.

FIG. 5 illustrates a vehicle instrument panel 80 according to a comparative example. Note that in this comparative example, configurations that are the same as those of the present exemplary embodiment are allocated the same reference numerals, and explanation thereof is omitted as appropriate.

As illustrated in FIG. 5, in a case in which the base material 82 does not include ribs, the skin joining part 38 of the skin 30 is displaced downstream of the injection port, namely, to the side of the lower wall 52, by the foaming crude liquid that has flowed in, and falls downward. Note that in FIG. 5, the two-dot chain line indicates the skin 30 in the area of the skin joining part 38 before falling downward.

When the skin joining part 38 falls downward, the flow path between the lower wall 52 and the lower skin material 36 in the concave part 84 of the base material 82 is narrowed or blocked, and the flow of the foaming crude liquid between the base material lower part 42 and the lower skin material 36 is obstructed. In such a case, in the instrument panel 80, a portion may be formed in which the polyurethane foam is not disposed between the skin 30 and the base material 82. Moreover, when the skin joining part 38 falls downward, wrinkles may be generated in the skin 30 in the vicinity of the skin joining part 38. In this case, the resulting wrinkles cause the appearance and feel of the boundary between the upper skin material 34 and the lower skin material 36 from the vehicle cabin side to deteriorate.

Although it is conceivable to design the concave part to be large enough to ensure a flow path for the foaming crude liquid even if the skin joining part 38 falls downward, this reduces the space inside the instrument panel in the vehicle, namely, at the rear side of the base material, thereby diminishing the space efficiency.

In contrast, according to the instrument panel 10 of the present exemplary embodiment, as illustrated in FIG. 2, plural ribs 56 are provided below the skin joining part 38 at the concave part 44 of the base material 28. The skin joining part 38 that is pushed by the foaming crude liquid and is susceptible to falling down is supported from below by the plural ribs 56. Namely, the plural ribs 56 secure the flow path for the foaming crude liquid, enabling the foaming crude liquid to flow extensively into the space between the base material lower part 42 and the lower skin material 36. This enables the polyurethane foam to be evenly filled in and to achieve the intended design.

Moreover, according to the instrument panel 10 of the present exemplary embodiment, as illustrated in FIG. 3, the plural ribs 56 are arranged in parallel with each other at intervals along the skin joining part 38 extending in the vehicle width direction. This enables a wide flow path for the foaming crude liquid to be secured. This enables the foaming crude liquid to be injected more efficiently and evenly between the base material 28 and the skin 30.

Moreover, as illustrated in FIG. 1, an upper skin member 34 is disposed at an upper part, and a lower skin member 36 is disposed at a lower part. Further, as illustrated in FIG. 2, the skin joining part 38, which is a joint section between the upper skin material 34 and the lower skin material 36, is inserted into the concave part 44 of the base material 28. That is, since, when viewed from the vehicle cabin, the skin 30 is divided between upper and lower parts at the concave part 44 recessed toward the front side of the vehicle, the design properties are improved in comparison to cases in which the seam of the skin material is exposed.

Moreover, the upper skin material 34 and the lower skin material 36 are made of soft PVC. Therefore, compared to cases in which a hard material such as TPU is used, while it is thought that the skin joining part 38 tends to collapse when pressed by the foaming crude liquid during molding, in the present invention, since the skin joining part 38 is supported by the plural ribs 56 of the base material 28, the foaming crude liquid can be filled into every corner, enabling the intended design to be realized. Since PVC is inexpensive and emits less carbon dioxide during manufacture, compared to cases in which TPU is used, cost and environmental load can be reduced.

Moreover, while improving the design properties inside the vehicle cabin by using a light-colored skin material as the lower skin material 36, reflection at the windshield glass 16 is suppressed by using a dark-colored skin material as the upper skin material 34, enabling excellent external visibility from the driver's seat to be maintained.

Supplementary Explanation of the Above Exemplary Embodiment

Although explanation has been given regarding an exemplary embodiment in which the skin 30 is configured including the upper skin material 34 and the lower skin material 36, there is no limitation thereto. For example, the skin is not limited to being divided between up and down, but may be divided between left and right. Alternatively, for example, three or more skin materials may be joined together to configure the skin. In either case, the ribs are provided at positions at the base material that face the skin joining part, thereby ensuring a flow path for the foaming crude liquid.

In the above exemplary embodiment, although explanation has been given of a case in which one injection port (not illustrated) is provided in the base material upper part 40 and the plural ribs are provided at the lower side of the skin joining part 38 in the concave part 44, namely at the front side of the lower wall 52, there is no limitation thereto. For example, injection ports may be provided at plural locations above the base material. Alternatively, for example, the injection port may be provided at a lower part of the base material. In this case, the foaming crude liquid flows into the concave part from below, and the plural ribs may be provided on an upper wall of the concave part, which is a downstream side. This enables the skin joining part to be kept from collapsing toward the upper wall side and blocking the flow path.

Although explanation has been given regarding a case in which plural ribs 56 are provided in the above exemplary embodiment, there is no limitation thereto, and the rib that supports the skin joining part may be a single rib. Although explanation has been given regarding a case in which the plural ribs 56 are arranged parallel to each other with gaps therebetween, there is no limitation thereto, and for example, the ribs may be provided radially, centered on the injection port. Although the plural ribs 56 have been described as being integrally molded with the base material 28, the ribs may be molded separately from the base material.

Moreover, in the above exemplary embodiment, the upper skin material 34 and the lower skin material 36 are both made of PVC, but there is no limitation thereto. For example, one of the upper skin material 34 or the lower skin material 36 may be made of PVC, while the other is made of another material. Further, the skin does not have to be configured including a PVC skin material. Moreover, the skin can be configured using various skin materials, such as cloth materials, knitted materials, synthetic leather, leather, and the like. Whichever type of skin material is used, especially in cases in which a skin material that is softer than PVC is used, the ribs effectively inhibit the collapse of the skin joining part. Of course, the skin may be configured including a hard skin material.

In the above exemplary embodiment, although explanation has been given regarding a case in which a substantially parallelogram-shaped rib 56, whose upper side is substantially parallel to the lower wall 52 in a side view, is provided at a surface of a part of the lower wall 52 and the curved part 54, the shape and arrangement of the ribs are not limited to the above description. Namely, any configuration may be adopted as long as the ribs provided in the concave part support the skin joining part so as to inhibit the collapse of the skin joining part and secure the flow path for the foaming crude liquid, and for example, the modified example illustrated in FIG. 4 may be adopted. Note that in this modified example, configurations that are the same as those of the present exemplary embodiment are allocated the same reference numerals, and explanation thereof is omitted as appropriate.

Figure 4:
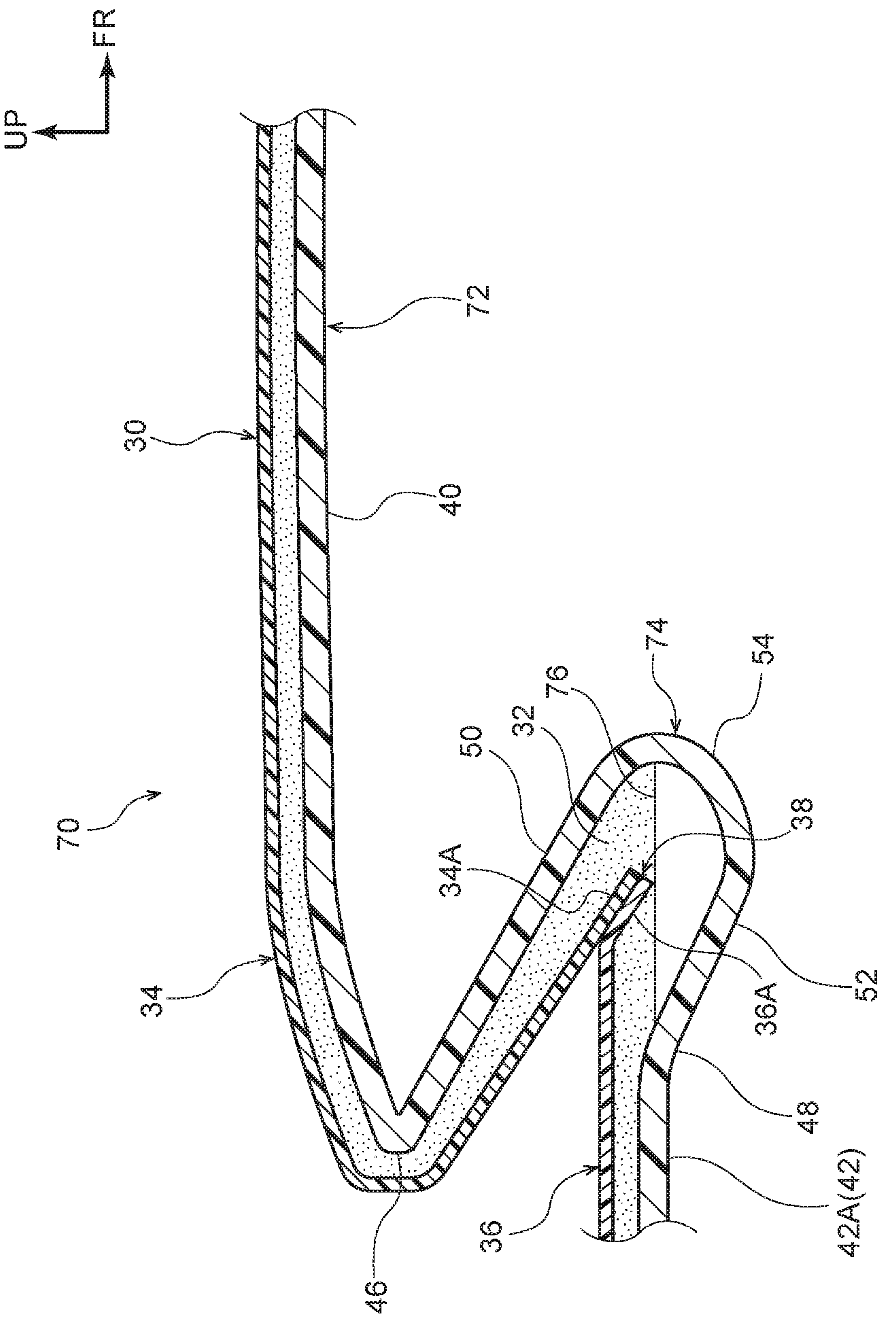
FIG. 4 is a side cross-sectional view of a vehicle instrument panel according to a modified example.

The vehicle instrument panel 70 illustrated in FIG. 4 includes plural ribs 76 that are substantially semicircular in side view, provided on a surface side of the concave part 74 of the base material 72 extending from the curved part 54 to the lower wall 52. In the cushion molding process, the skin joining part 38 that is pressed by the foaming crude liquid and is susceptible to collapse is supported from below by the plural ribs 76. As a result, the foaming crude liquid flows between the plural ribs 76 and extensively flows into the space between the base material lower part 42 and the lower skin material 36. According to the instrument panel 70 of the present modified example, the plural ribs 76 improve the strength of the concave part 44.

The following supplementary notes are further disclosed regarding the above exemplary embodiment.

(Supplementary Note 1)

A vehicle instrument panel, includes:

a base material extending in a vehicle width direction, at a front part of a vehicle cabin interior of a vehicle;

a skin provided with a pair of skin materials, each of the skin materials having an end part thereof joined together at a skin joining part, and the skin forming a design face at the vehicle cabin interior; and a cushion part provided between the base material and the skin and formed of a foamed resin, the base material being provided with a rib at a position facing the skin joining part of the skin.

(Supplementary Note 2)

The vehicle instrument panel of supplementary note 1, in which:

the base material includes a base material upper part disposed at a vehicle rear side of a lower end part of a windshield separating a vehicle cabin interior part from a vehicle cabin exterior part, a base material lower part disposed at a vehicle rear side and a vehicle lower side of the base material upper part, and a concave part that links a rear end of the base material upper part with a front end of the base material lower part, that extends in the vehicle width direction, and that is recessed toward a vehicle front side as seen in a side view, the pair of skin materials of the skin are configured as an upper skin material that covers the base material upper part and a lower skin material that covers the base material lower part, the skin joining part, at which a surface of one end part at a vehicle rear side of the upper skin material is joined to a surface of one end part at a vehicle front side of the lower skin material, is inserted into the concave part of the base material, a foaming crude liquid of the foamed resin configuring the cushion part is injected from the base material upper part of the base material toward the concave part, and the rib is disposed at the concave part at a lower side of the skin joining part.

(Supplementary Note 3)

The vehicle instrument panel of supplementary note 1 or supplementary note 2, in which the rib of the base material includes plural ribs, which are disposed in parallel with each other at an interval in the vehicle width direction.

(Supplementary Note 4)

The vehicle instrument panel of any one of supplementary note 1 to supplementary note 3, in which at least one skin material of the pair of skin materials is configured by polyvinyl chloride.

What is claimed is:

1. A vehicle instrument panel, comprising:

a base material extending in a vehicle width direction, at a front part of a vehicle cabin interior of a vehicle;

a skin provided with a pair of skin materials, each of the skin materials having an end part thereof joined together at a skin joining part, and the skin forming a design face at the vehicle cabin interior; and a cushion part provided between the base material and the skin and formed of a foamed resin, wherein the base material is provided with a rib at a position facing the skin joining part of the skin, and wherein the base material comprises:

a base material upper part disposed at a vehicle rear side of a lower end part of a windshield separating a vehicle cabin interior part from a vehicle cabin exterior part, a base material lower part disposed at a vehicle rear side and at a vehicle lower side of the base material upper part, and a concave part that links a vehicle rear side end of the base material upper part with a vehicle front side end of the base material lower part, extends in the vehicle width direction, and is recessed toward a vehicle front side as seen in a side view.

2. The vehicle instrument panel of claim 1, wherein:

the pair of skin materials of the skin are configured as an upper skin material that covers the base material upper part and a lower skin material that covers the base material lower part, the skin joining part, at which a surface of one end part at a vehicle rear side of the upper skin material is joined to a surface of one end part at a vehicle front side of the lower skin material, is inserted into the concave part of the base material, a foaming crude liquid of the foamed resin configuring the cushion part is injected from the base material upper part of the base material toward the concave part, and the rib is disposed at the concave part at a lower side of the skin joining part.

3. The vehicle instrument panel of claim 2, wherein the rib of the base material comprises a plurality of ribs, which are disposed in parallel with each other at an interval in the vehicle width direction.

4. The vehicle instrument panel of claim 1, wherein at least one skin material of the pair of skin materials is configured by polyvinyl chloride.

5. A method of manufacturing a vehicle instrument panel, the method comprising:

molding a skin having a pair of skin materials each having an end part thereof joined together at a skin joining part;

molding a base material provided with a plurality of ribs at positions corresponding to the skin joining part;

setting the base material in one die and setting the skin in another die, and closing the one die and the other die; and molding a cushion part by injecting a foaming crude liquid between the base material and the skin, wherein the base material comprises:

a base material upper part disposed at a vehicle rear side of a lower end part of a windshield separating a vehicle cabin interior part from a vehicle cabin exterior part, a base material lower part disposed at a vehicle rear side and a vehicle lower side of the base material upper part, and a concave part that links a vehicle rear side end of the base material upper part with a vehicle front side end of the base material lower part, extends in the vehicle width direction, and is recessed toward a vehicle front side as seen in a side view.

* * * * *